United States Patent
Iwase

(10) Patent No.: US 9,735,454 B2
(45) Date of Patent: Aug. 15, 2017

(54) APPARATUS FOR CONTROLLING LITHIUM-ION BATTERY AND METHOD OF RECOVERING LITHIUM-ION BATTERY

(75) Inventor: Kosuke Iwase, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 382 days.

(21) Appl. No.: 14/371,252

(22) PCT Filed: Jan. 25, 2012

(86) PCT No.: PCT/JP2012/000463
§ 371 (c)(1),
(2), (4) Date: Jul. 9, 2014

(87) PCT Pub. No.: WO2013/111186
PCT Pub. Date: Aug. 1, 2013

(65) Prior Publication Data
US 2015/0004443 A1    Jan. 1, 2015

(51) Int. Cl.
*H01M 10/54* (2006.01)
*H01M 10/42* (2006.01)
*H01M 10/44* (2006.01)
*H01M 10/0525* (2010.01)

(52) U.S. Cl.
CPC ....... *H01M 10/54* (2013.01); *H01M 10/0525* (2013.01); *H01M 10/42* (2013.01); *H01M 10/4235* (2013.01); *H01M 10/44* (2013.01); *Y02T 10/7011* (2013.01); *Y02W 30/84* (2015.05)

(58) Field of Classification Search
CPC ...... H01M 10/54; H01M 10/42; H01M 10/44; H01M 10/0525; H01M 10/4235
See application file for complete search history.

(56) References Cited

U.S. PATENT DOCUMENTS

2011/0187330 A1*  8/2011  Shimizu .................... H02J 7/04
                                                         320/162

FOREIGN PATENT DOCUMENTS

| JP | 2010-520610 | 6/2010 |
|---|---|---|
| JP | 2010-198759 | 9/2010 |
| JP | 2011-142016 | 7/2011 |

(Continued)

*Primary Examiner* — Jane Rhee
(74) *Attorney, Agent, or Firm* — Finnegan, Henderson, Farabow, Garrett & Dunner, LLP

(57) ABSTRACT

An apparatus for controlling a lithium-ion battery is provided in which a power-generating element including a positive electrode element and a negative electrode element is housed in a case, wherein the case contains a compound releasing an electron toward the positive electrode element to provide a proton at an electric potential lower than a first electric potential being a positive electrode potential corresponding to a negative electrode potential at which precipitation of lithium occurs, the electric potential lower than the first electric potential being a second electric potential and being higher than a positive electrode potential corresponding to an upper limit value of working voltages of the lithium-ion battery, and the apparatus includes a controller configured to perform recovery processing of changing the lithium precipitated on the negative electrode element into a lithium ion using the proton by using a power source section supplying a power to the lithium-ion battery to bring the positive electrode potential to the second electric potential.

8 Claims, 7 Drawing Sheets

(56) References Cited

FOREIGN PATENT DOCUMENTS

| | | |
|---|---|---|
| JP | 2011-159545 | 8/2011 |
| WO | WO 2008/109734 | 9/2008 |

* cited by examiner

APPARATUS FOR CONTROLLING LITHIUM-ION BATTERY AND METHOD OF RECOVERING LITHIUM-ION BATTERY

CROSS-REFERENCE TO RELATED APPLICATIONS

This application is a national phase application of International Application No. PCT/JP2012/000463, filed Jan. 25, 2012, the content of which is incorporated herein by reference.

TECHNICAL FIELD

The present invention relates to an apparatus for controlling a lithium-ion battery, and more particularly, to a technique for recovering from the deterioration of a capacity due to precipitation of lithium in a lithium-ion battery.

BACKGROUND ART

A lithium-ion secondary battery is known as an electric storage apparatus which stores an electric power to be supplied to a motor for running a vehicle. It is known that repeated charge and discharge of the lithium-ion secondary battery causes precipitation of lithium on the surface of a negative electrode to result in the deterioration of the battery.

Patent Document 1 has disclosed a battery system including a heating means for heating a secondary battery to a predetermined temperature, a temperature sensing means for sensing the temperature of the secondary battery, and a heating control means for controlling the heating means on the basis of the result of the sensing of the temperature sensing means to heat the secondary battery to a temperature equal to or higher than a level at which a dendrite containing a constituent metal of at least one of electrodes can be dissolved and equal to or lower than a level at which the negative electrode is in a state including a solid phase.

PRIOR ART DOCUMENT

Patent Document

[Patent Document 1] Japanese Patent Laid-Open No. 2011-142016

DISCLOSURE OF THE INVENTION

Problems to be Solved by the Invention

In the method mentioned above, however, a high thermal load is applied to the secondary battery during the dissolution of the precipitated lithium, so that the battery performance may be reduced due to heat damage.

To address this, it is an object of the present invention to change precipitated lithium back into lithium ions without applying a significant thermal load.

Means for Solving the Problems

To solve the problems, according to an aspect, the present invention provides an apparatus for controlling a lithium-ion battery in which a power-generating element including a positive electrode element and a negative electrode element is housed in a case, wherein the case contains a compound releasing an electron toward the positive electrode element to provide a proton at an electric potential lower than a first electric potential being a positive electrode potential corresponding to a negative electrode potential at which precipitation of lithium occurs, the electric potential lower than the first electric potential being a second electric potential, the second electric potential being higher than a positive electrode potential corresponding to an upper limit value of working voltages of the lithium-ion battery, and the apparatus includes a controller configured to perform recovery processing of changing the lithium precipitated on the negative electrode element into a lithium ion using the proton by using a power source section supplying an electric power to the lithium-ion battery to bring the positive electrode potential to the second electric potential.

Advantage of the Invention

According to the present invention, the precipitated lithium can be changed back into lithium ions without applying a significant thermal load.

MODE FOR CARRYING OUT THE INVENTION

Figure 1:
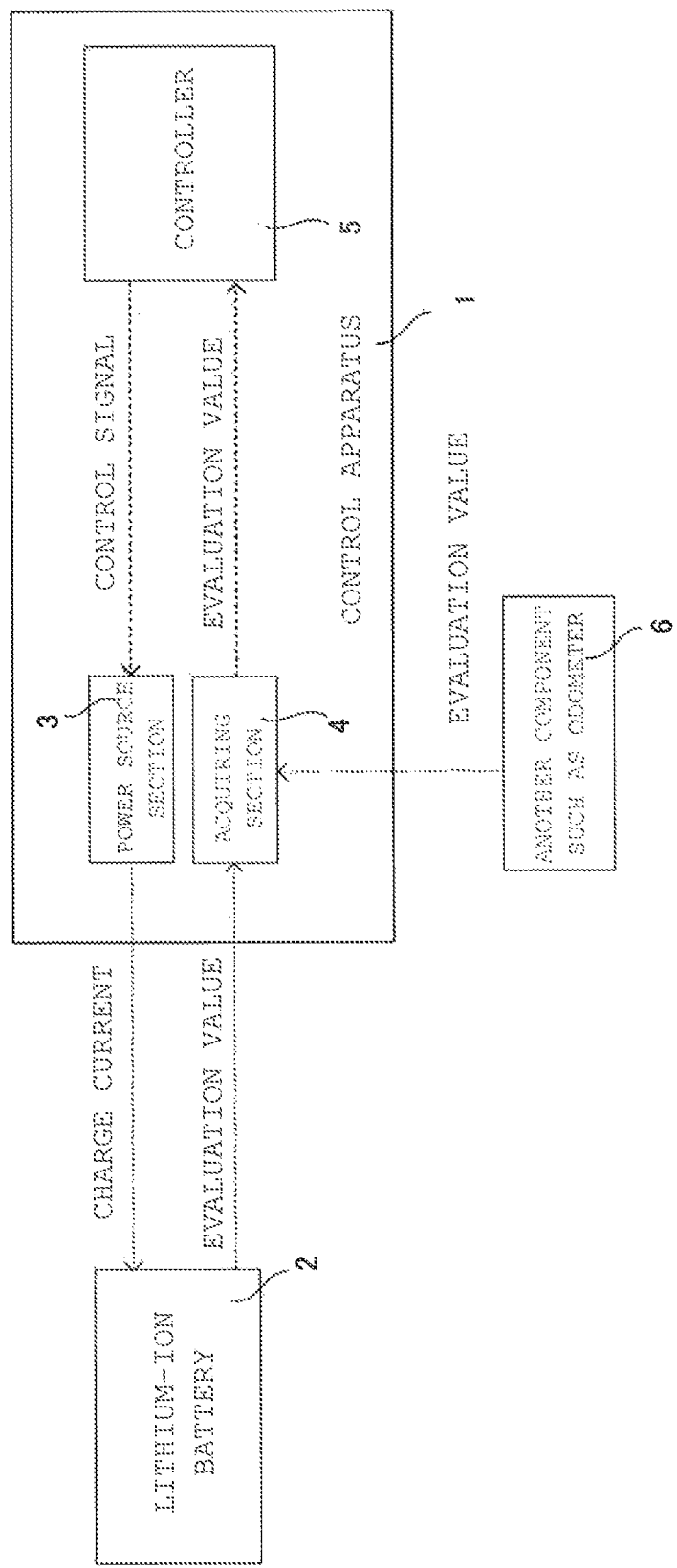
FIG. 1 A block diagram showing the configuration of an apparatus for controlling a lithium-ion battery.

Description will be made of the schematic configuration of an apparatus for controlling a lithium-ion battery according to an embodiment with reference to FIG. 1. FIG. 1 is a functional block diagram of the control apparatus. Arrows indicate the directions of flows of signals and the like. The control apparatus 1 according to the present embodiment is used for recovery processing performed to change precipitated lithium in the lithium-ion battery 2 back into lithium ions. The control apparatus 1 includes a power source section 3, an acquiring section 4, and a controller 5. The power source section 3 is connected to the lithium-ion battery 2 through wiring, not shown. The controller 5 outputs a control signal to the power source section 3 for allowing the charge of the lithium-ion battery 2. The power source section 3 charges the lithium-ion battery 2 on the basis of the control signal output from the controller 5.

Figure 4:
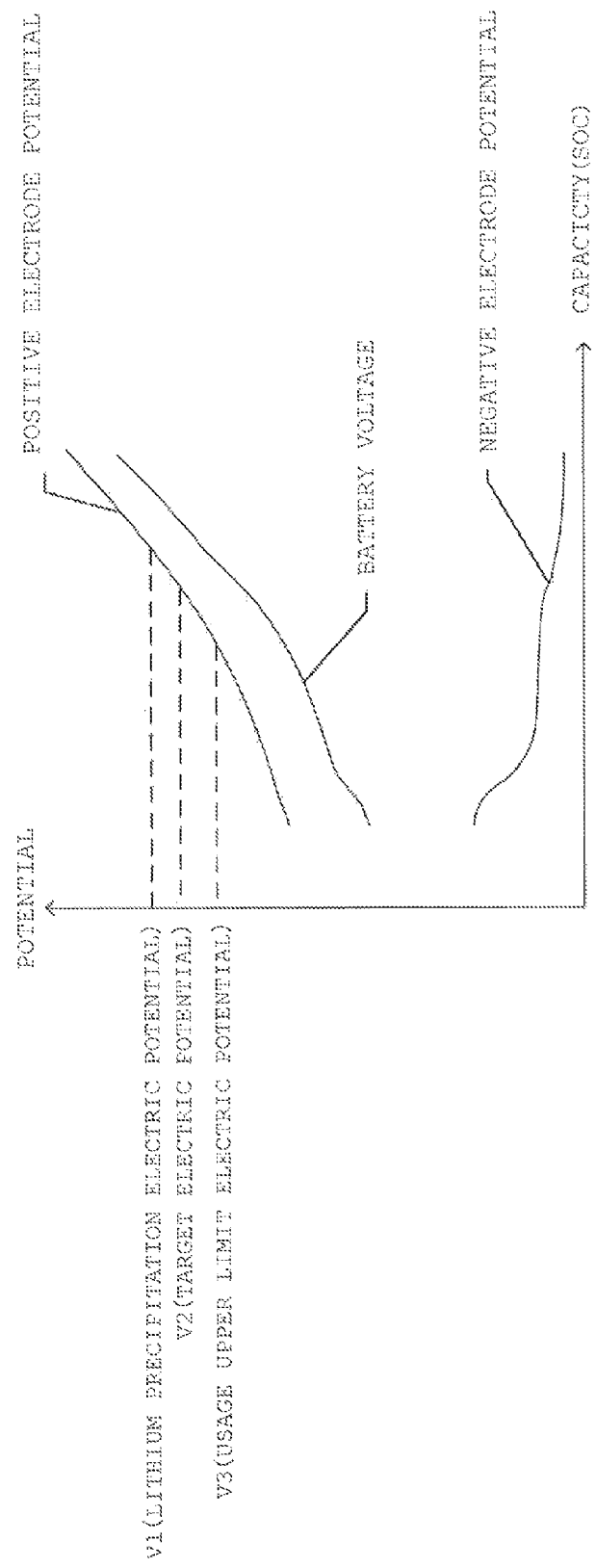
FIG. 4 A graph schematically showing the relationship between the electric potential (vertical axis) of a positive electrode and the capacity (horizontal axis) in the lithium-ion battery.

The lithium-ion battery 2 includes a compound which provides protons at a target electric potential V2 shown in FIG. 4. The acquiring section 4 acquires an evaluation value associated with the degree of lithium precipitation in the lithium-ion battery 2. The controller 5 allows the charge with the power source section 3 when the evaluation value exceeds a predetermined value. This causes the electric potential of the lithium-ion battery 2 to reach the target electric potential V2 to provide the protons. The provided protons change precipitated lithium on a negative electrode element of the lithium-ion battery 2 back into lithium ions. The details of the recovery processing are described later.

The evaluation value car be acquired from the lithium-ion battery. 2 or can be acquired from another component 6 such as an odometer. The evaluation value acquired from the lithium-ion battery 2 may be the capacity or the internal resistance of the lithium-ion battery 2. When lithium is precipitated on the negative electrode element of the lithium-ion battery 2, the capacity of the lithium-ion battery 2 is reduced to increase the internal, resistance. Thus, the degree of lithium precipitation can be determined from the present capacity or the present internal resistance of the lithium-ion battery 2. The evaluation value acquired from the other component 6 may be the running distance of a vehicle, the elapsed period of use, or the number of turn-ons of an ignition coil. Since the repeated charge and discharge of the lithium-ion battery 2 leads to lithium precipitation, more lithium may be precipitated as the running distance of the vehicle or the like is increased. Thus, the degree of lithium precipitation can be determined from the running distance of the vehicle or the like.

Next, description is made of the vehicle on which the control apparatus 1 according to the present embodiment is mounted. FIG. 1 is a block diagram of the vehicle. In FIG. 1, arrows of dotted lines indicate the directions of flows of signals. The vehicle is a hybrid vehicle having a driving system for driving a motor using the output from the battery and a driving system with an engine. The present invention is also applicable to an electric vehicle having only the driving system for driving the motor using the output from the battery.

Figure 2:
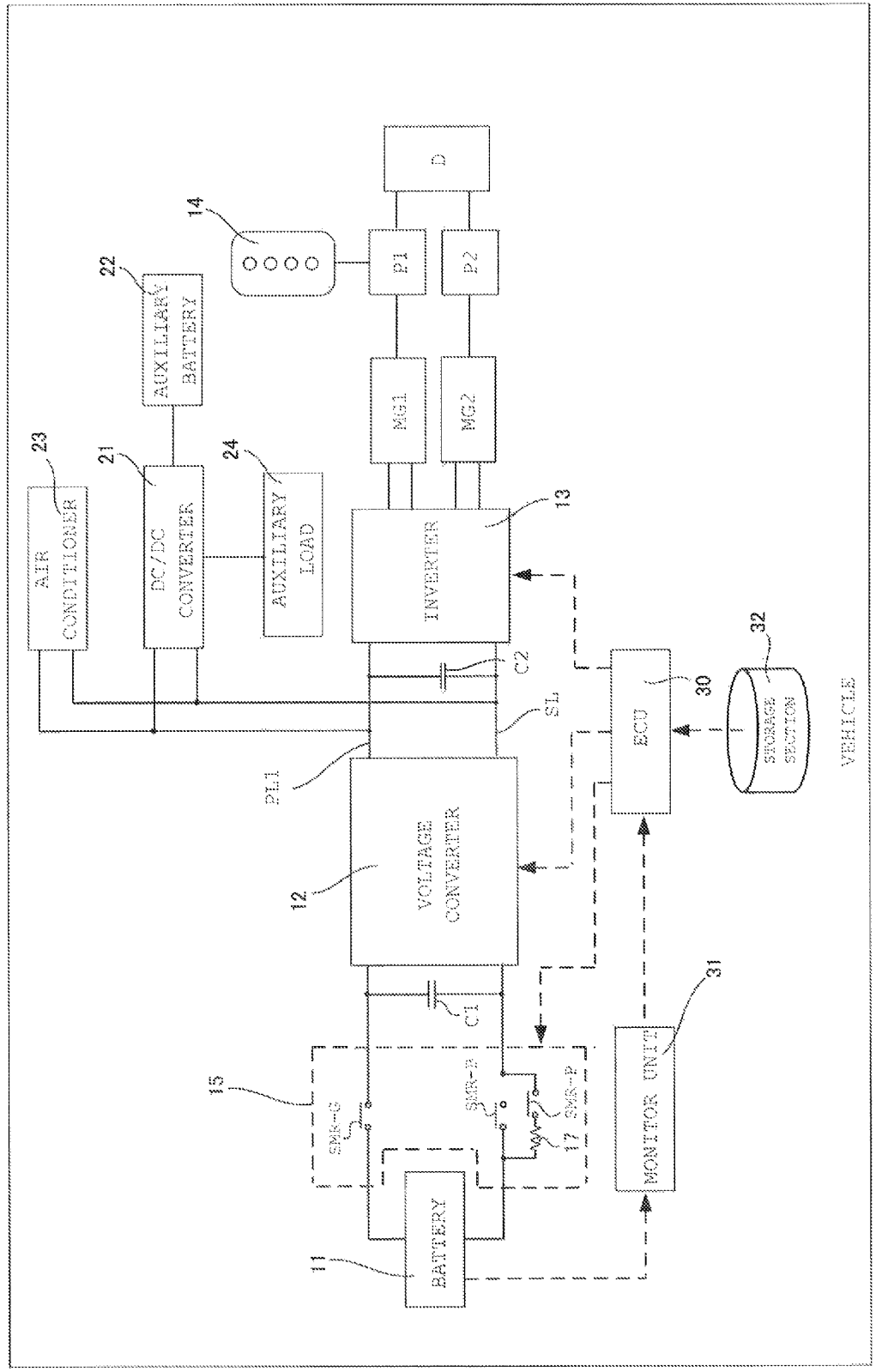
FIG. 2 A block diagram of a vehicle.

Referring to FIG. 2, the vehicle includes a battery 11, smoothing capacitors C1 and C2, a voltage converter 12, an inverter 13, a motor generator MG1, a motor generator MG2, a power splitting planetary gear P1, a reduction planetary gear P2, a decelerator D, an engine 14, a relay 15, a DC/DC converter 21, an auxiliary battery 22, an air conditioner 23, an auxiliary load 24, an ECU 30, a monitor unit 31, and a storage section 32.

Figure 3:
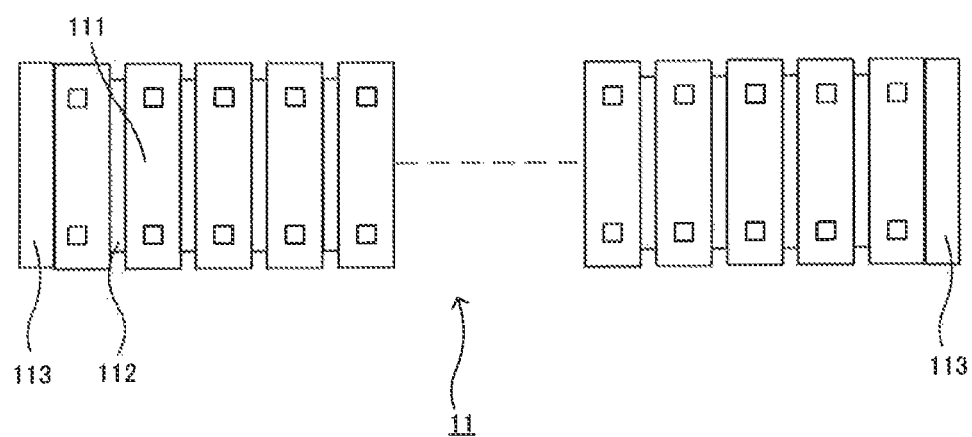
FIG. 3 A schematic diagram showing the configuration of the battery.

FIG. 3 shows the schematic configuration of the battery. The battery 11 includes a plurality of lithium-ion cells 111 arranged along a predetermined direction, spacers 112 each placed between two of the lithium-ion cells 111 adjacent to each other in the predetermined direction, and end plates 113 placed at the positions between which the stack formed of the cells ill and the spacers 112 is sandwiched. The lithium-ion cell 111 includes a wound body, a battery case (corresponding to a case) housing the wound body, and an electrolytic solution contained in the battery case together with the wound body.

The wound body is provided by winding a power-generating sheet (corresponding to a power-generating element) around a predetermined axis. The power-generating sheet includes a positive electrode element in sheet form, a negative electrode element in sheet form, and a separator disposed between the positive electrode element and the negative electrode element. The positive electrode element includes a collector foil and an active material (for example, a lithium-transition metal composite oxide) applied to the collector foil. The negative electrode element includes a collector foil and an active material (for example, carbon) applied to the collector foil.

The battery case contains liquid biphenyl (BP) as well as the electrolytic solution. Biphenyl is used as the compound which provides the protons.

Referring again to FIG. 2, the vehicle also includes a power source line PL1 and a ground line SL. The battery 11 is connected to the voltage converter 12 through system main relays SMR-G, SMR-B, and SMR-P which constitute the relay 15. The system main relay SMR-G is connected to a positive terminal of the battery 11, and the system main relay SMR-B is connected to a negative terminal of the battery 11. The system main relay SMR-P and a precharge resistor 17 are connected in parallel with the system main relay SMR-B.

These system main relays SMR-G, SMR-B, and SMR-P are relays having contacts that are closed when their coils are energized. "ON" of the SMR means an energized state, and "OFF" of the SMR means a non-energized state.

The ECU 30 turns off all the system main relays SMR-G, SMR-B, and SMR-P while the power is shut off, that is, while an ignition (IG) switch is at an OFF position. Specifically, the ECU 30 turns off the current for energizing the coils of the system main relays SMR-G, SMR-B, and SMR-P. The position of the ignition (IG) switch is switched in the order from the OFF position to an ON position. The ECU 30 may be a CPU or an MPU, and may include an ASIC circuit which performs, based on circuital operation, at least part of processing executed in the CPU or the like.

Upon start-up of a hybrid system (upon connection to a main power source), that is, for example when a driver steps on a brake pedal and depresses a start switch of push type, the ECU 30 first turns on the system main relay SMR-G. Next, the ECU 30 turns on the system main relay SMR-P to perform precharge.

The precharge resistor 17 is connected to the system main relay SMR-P. Thus, even when the system main relay SMR-P is turned on, the input voltage to the inverter 13 can be slowly increased to prevent the occurrence of an inrush current.

When the ignition (IG) switch is switched from the ON position to the OFF position, the ECU 30 first turns off the system main relay SMR-B and then turns off the system main relay SMR-G. This breaks the electrical connection between the battery 11 and the inverter 13 to enter a power shut-off state. The system main relays SMR-B, SMR-G, and SMR-P are controlled for energization or non-energization in response to a control signal provided by the ECU 30.

The capacitor C1 is connected between the power source line PL1 and the ground line SL and smoothes an inter-line voltage. The DC/DC converter 21 and the air conditioner 23 are connected in parallel between the power source line PL1 and the ground line SL. The DC/DC converter 21 drops the voltage supplied by the battery 11 to charge the auxiliary battery 22 or to supply the electric power to the auxiliary load 24. The auxiliary load 24 includes an electronic device such as a lamp and an audio for the vehicle, not shown.

The voltage converter 12 increases an inter-terminal voltage of the capacitor C1. The capacitor C2 smoothes the voltage increased by the voltage converter 12. The inverter 13 converts the DC voltage provided by the voltage converter 12 into a three-phase AC current and outputs the AC current to the motor generator MG2. The reduction planetary gear P2 transfers a motive power obtained in the motor generator MG2 to the decelerator D to drive the vehicle. The power splitting planetary gear P1 splits a motive power obtained in the engine 14 into two. One of them is transferred to wheels through the decelerator D, and the other drives the motor generator MG1 to perform power generation. The electric power generated in the motor generator MG1 is used for driving the motor generator MG2 to assist the engine 14. The reproduction planetary gear P2 transfers a motive power transferred through the decelerator D to the motor generator MG2 during the deceleration of the vehicle to drive the motor generator MG2 as a power generator. The electric power obtained in the motor generator MG2 is converted from the three-phase AC current into a DC voltage in the inverter. 13 and is transferred to the voltage converter 12. In this case, the ECU 30 performs control such that the voltage converter 12 operates as a step-down circuit. The electric power at the voltage dropped by the voltage converter 12 is stored in the battery 11.

During the stop of the vehicle, the motive power of the engine 14 can drive the motor generator MG1 to generate electric power which in turn can charge the battery 11.

The monitor unit 31 obtains the information about the voltage, current, and temperature of the battery 11. The monitor unit 31 is formed as a unit integral with the battery 11. The voltage value obtained by the monitor unit 31 may be the voltage value of each lithium-ion cell 111 or may be the voltage value for each of blocks consisting of a plurality of lithium-ion cells 111. The temperature of the battery 11 may be obtained through a thermistor, not shown. The current value of the battery 1 may be obtained by a current sensor, not shown.

The storage section 32 stores the various types of information required to control the charge and discharge of the battery 11 and also stores programs or the like required to perform the recovery processing. The ECU 30 reads and interprets the programs stored in the storage section 32 in performing the recovery processing for the battery 11, thereby allowing the recovery processing for the battery 11 to be achieved.

Next, the correspondence between FIG. 1 and FIG. 2 is described. The lithium-ion battery 2 shown in FIG. 1 corresponds to the battery 11 shown in FIG. 2. The power source section 3 shown in FIG. 1 corresponds to the motor generator MG1 shown in FIG. 2. The acquiring section 4 shown in FIG. 1 corresponds to the monitor unit 31 shown in FIG. 2. The controller 5 shown in FIG. 1 is embodied by the ECU 30, the relay 15, the voltage converter 12, the inverter 13 and the like shown in FIG. 2 cooperating with each other.

Figure 5:
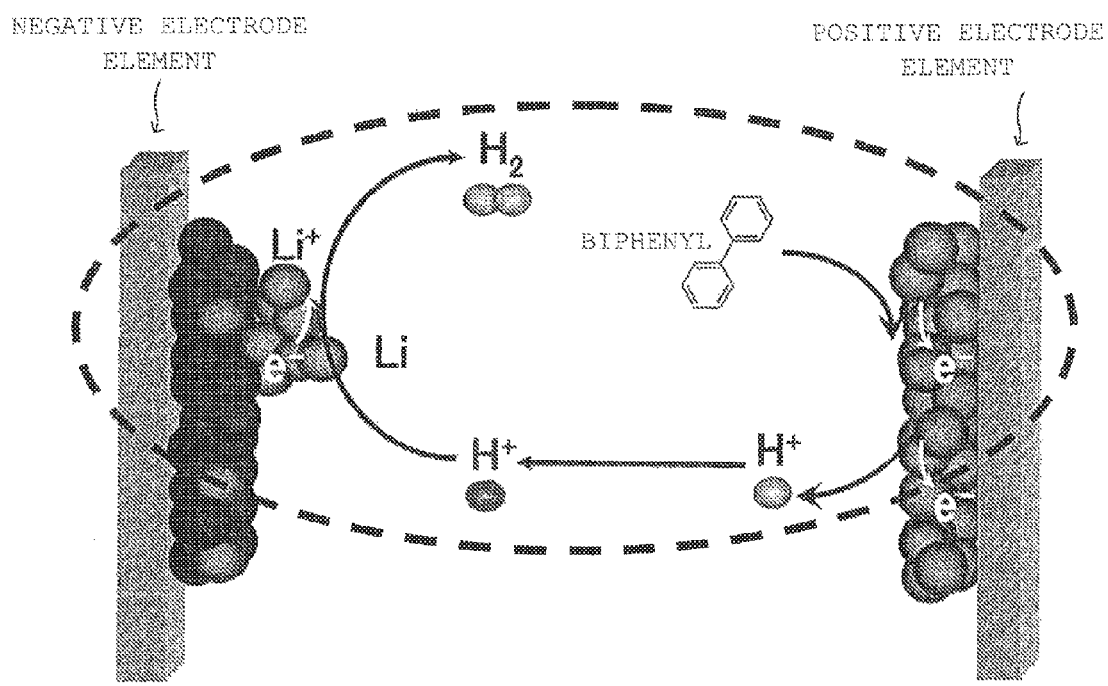
FIG. 5 A diagram schematically showing the mechanism of how biphenyl reduces precipitated lithium.

Referring to FIG. 4 and FIG. 5, the mechanism of the recovery of the lithium-ion cell 111 is described. FIG. 4 schematically shows the relationship between the electric potential (vertical axis) of a positive electrode and the capacity (horizontal axis) in the lithium-ion cell 111. FIG. 5 schematically shows the mechanism of how biphenyl changes precipitated lithium back into lithium ions. As shown in FIG. 5, lithium is precipitated on the negative electrode element in the lithium-ion cell 111 due to repeated charge and discharge. The precipitation of lithium is caused by an electric potential drop of a negative electrode of the lithium-ion cell 111 to a predetermined value. The predetermined value varies depending on the working voltage of the lithium-ion cell 111 or the like.

When the lithium-ion cell 111 is charged to increase the positive electrode potential to the target electric potential V2 (corresponding to a second electric potential), electrons are released from atoms of hydrogen of biphenyl toward the active material of the positive electrode element, and biphenyl releases protons (H+). The released protons receive electrons from the precipitated lithium on the negative electrode element and change into molecules of hydrogen. The lithium, which passed the electrons to the protons, changes back into lithium ions.

As shown in FIG. 4, the target electric potential V2 needs to be set at a level lower than a lithium precipitation electric potential V1 (corresponding to a first electric potential) equal to a positive electrode potential corresponding to a negative electrode potential at which the lithium precipitation occurs and higher than an upper limit working electric potential V3 equal to a positive electrode potential corresponding to an upper limit value of the working voltages of the lithium-ion cell 111. The phrase "the positive electrode potential corresponding to the negative electrode potential at which the lithium precipitation occurs" means the positive electrode potential at which lithium is precipitated on the negative electrode element. The phrase "the working voltages of the lithium-ion cell" means the design value determined in view of the suppression of deterioration of the lithium-ion cell 111 and the like. The ECU 30 controls the charge and discharge of the battery 111 such that the lithium-ion cell 111 is basically used within the range of the working voltages.

If the positive electrode potential of the lithium-ion cell 111 is higher than the lithium precipitation electric potential V1 in the recovery processing, lithium is precipitated to render the recovery processing useless. It is thus necessary to set the target electric potential V2 lower than the lithium precipitation electric potential V1. If the target electric potential V2 is lower than the usage upper limit electric potential V3, the lithium-ion cell 111 is charged or discharged to consume biphenyl when the recovery processing is not required, so that the protons may be lacking when the recovery processing is required. It is thus necessary to set the target electric potential V2 higher than the usage upper limit electric potential V3.

Since biphenyl releases electron toward the positive electrode element when the positive electrode potential is equal to or higher than a decomposition electric potential, the target electric potential V2 may be set not at a particular fixed electric potential but at a value equal to or higher than the decomposition electric potential and lower than the lithium precipitation electric potential V1.

Next, the processing performed by the ECU 30 is described with reference to a flow chart in FIG. 6. At step S101, the ECU 30 determines whether or not the ignition (IG) switch is turned on. When the ignition (IG) switch is turned on (Yes at step S101), the ECU 30 proceeds to step S102. At step S102, the ECU 30 determines whether or not the present capacity of the battery 11 is lower than the capacity calculated by multiplying the initial capacity by 0.95. When the present capacity of the battery 11 is lower than the capacity calculated by multiplying the initial capacity by 0.95 (Yes at step S102), the ECU 30 determines that the battery 11 is deteriorated due to the lithium precipitation and proceeds to step S103. When the present capacity of the battery 11 is equal to or higher than the capacity calculated by multiplying the initial capacity by 0.95 (No at step S102), the ECU 30 determines that the battery 11 is not deteriorated due to the lithium precipitation and proceeds to processing at step S106.

The initial capacity of the battery 11 can be previously stored in the storage section 32 shown in FIG. 2. The initial capacity of the battery 11 refers to the capacity immediately after the battery 11 is manufactured. The present capacity of the battery 11 can be calculated from a total discharge amount after the battery 11 is discharged for a certain period of time. For example, the battery 11 is charged to a full charge state (SOC (State Of Charge)=100%) and then is connected to the auxiliary load 24 to perform continuous discharge. The time taken for the voltage of the battery 11 to reach a discharge end voltage is measured. From the result, the present capacity of the battery 11 can be calculated. In this case, for example, the motor generator MG1 is driven by the engine 14 to generate electric power which in turn can be used to charge the battery 11 to the full charge state. When the hybrid vehicle is a plug-in hybrid vehicle having a charger mounted thereon, the charger can be connected to an external power source to charge the battery 11 to the full charge state, for example.

Referring again to the flow chart, at step S103, the ECU 30 performs the recovery processing on the battery 11. The recovery processing may be performed in a charge and discharge cycle including charge processing of charging the battery 11 at a charge rate of 20 C for 0.1 seconds, discharge processing of discharging the battery 11 at a discharge rate of 2 C for 10 seconds, and suspension processing of suspending for 10 seconds after the discharge processing. The recovery processing may include continuously performing 100 such charge and discharge cycles. Since the charge increases the positive electrode potential of the lithium-ion cell 111 to the target electric potential V2 to cause biphenyl to release the protons which then change lithium back into lithium ions, the lithium precipitation is reduced. The discharge of the battery 11 after the charge is performed because the deterioration of the lithium-ion cell. 111 significantly proceeds when the cell 111 is maintained at an electric potential higher than the usage upper limit electric potential V3.

The charge of the battery 11 in the recovery processing can be performed by driving the engine 14 to rotate the motor generator MG1. The discharge of the battery 11 in the recovery processing can be performed by driving the auxiliary load 24.

When the recovery processing for the battery 11 is completed, at step S104, the ECU 30 increases the count of the number of the recovery processing operations for the battery 11 by one and stores the count in the storage section 32. Specifically, when the recovery processing for the battery 11 is performed for the first time, the count of the number of the recovery processing operations is increased from "zero" to "one."

When the increase of the count of the number of the recovery processing operations is completed, at step S105, the ECU 30 determines whether or not the capacity of the battery 11 is recovered. Since the determination of whether or not the capacity of the battery 11 is recovered is performed in the same manner as that at step S102, detailed description thereof is omitted. When the capacity of the battery 11 is recovered (No at step S105), the ECU 30 proceeds to step S106. When the capacity of the battery 11 is not recovered (Yes at step S105), the ECU 30 proceeds to step S107.

At step 106, the ECU 30 determines that the lithium precipitation is eliminated and allows the continuous use of the battery 11. At step S107, the ECU 30 determines whether or not the number of the recovery processing operations stored in the storage section 32 is larger than N. When the number of recovery processing operations is larger than N (Yes at step S107), the ECU 30 determines that the battery 11 is deteriorated for a reason different from the lithium precipitation (for example, deterioration of the material of the power-generating sheet) and notifies the failure of the battery 11 at step S108. The notification of the failure of the battery 11 may be performed by outputting sounds to an occupant or displaying an image on a display provided in the vehicle interior. When the number of recovery processing operations is equal to or smaller than N (No at step S107), the ECU 30 determines that the number of recovery processing operations is insufficient and again performs the recovery processing at step S103. The number N specified as the upper limit value of the number of recovery processing operations can be set as appropriate by those skilled in the art.

According to the present embodiment, the recovery processing does not require the use of any heating means, so that the battery 11 can be recovered while suppressing an increase in thermal load to the battery 11.

The lithium precipitation generally occurs due to an increased voltage of the lithium-ion cell 111. Thus, a possible approach to suppressing the lithium precipitation is to reduce the voltage during the use of the battery 11. In this approach, however, the output (W) of the battery 11 is reduced to limit the utilization of the battery 11. According to the method of the present embodiment, the recovery processing can reduce the lithium precipitated due to the increased voltage of the battery 11, so that the high output (W) of the lithium-ion cell can be achieved.

If the lithium-ion cell 111 with the precipitated lithium is left without taking any measures, a coating is formed between the precipitated lithium and the electrolytic solution. The formed coating interferes with the recovery processing. According to the present embodiment, the turn-off of the ignition (IG, switch triggers the determination of the presence or absence of the lithium precipitation to perform the recovery processing at short time intervals. Since the recovery processing is performed before the formation of the coating, the recovery processing for the battery 11 is facilitated.

Since the recovery processing is immediately performed only by increasing the electric potential of the positive electrode of the battery 11 to the target electric potential V2, the time taken for the recovery processing can be shortened. Even when the frequency of the recovery processing operations is increased, the use of the battery 11 (use for running the vehicle) is not significantly limited.

The lithium precipitation increases the temperature of heat generation in the battery 11. According to the present embodiment, however, the recovery processing reduces the precipitated lithium to suppress the increased temperature of heat generation in the battery 11.

EXAMPLE

Figure 7:
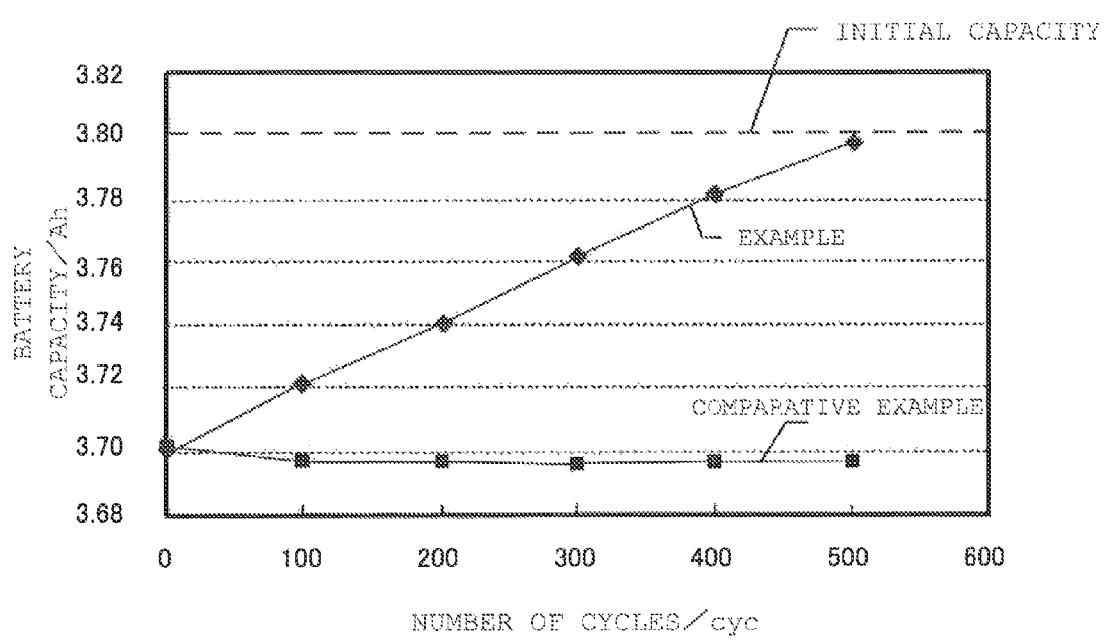
FIG. 7 A graph showing evaluation results.

The present invention will be described specifically with reference to Example. FIG. 7 is a graph showing the evaluation results of the recovery processing in which the horizontal axis represents the number of cycles and the vertical axis represents the battery capacity. In Example, the lithium-ion cell 111 according to the embodiment was used. In Comparative Example, a lithium-ion cell having no biphenyl was used. These lithium-ion cells were charged and discharged in predetermined charge and discharge cycles, and the battery capacities were measured once in every 100 cycles. One charge and discharge cycle was set to include charge processing of charging the lithium-ion cell at a charge rate of 20 C for 0.1 seconds, discharge processing of discharging the lithium-ion cell at a discharge rate of 2 C for 10 seconds, and suspension processing of suspending for 10 seconds after the discharge processing. The target electric potential V2 was set at 4.6 V.

As shown in the evaluation results, the lithium-ion cell 111 was recovered roughly to the initial capacity after 500 such charge and discharge cycles were performed.

(Modification 1)

Although the flow chart described above includes the determination that the lithium is precipitated when the present capacity of the battery 11 is lower than 95% of the initial capacity, the present invention is not limited thereto. For example, the lithium precipitation may be determined when the present capacity of the battery 11 is lower than X % of the initial capacity (where X %>95%). In this case, the frequency of the recovery processing operations for the battery 11 can be increased to extend the life of the battery 11. Alternatively, the lithium precipitation may be determined when the present capacity of the battery 11 is lower than Y % of the initial capacity (where Y %<95%). In this case, the frequency of the recovery processing operations for the battery 11 can be reduced to shorten the time for which the use of the battery 11 (use for running the vehicle) is limited.

(Modification 2)

Although the flow chart described above includes the determination of the presence or absence of the lithium precipitation from the capacity level of the battery 11, the present invention is not limited thereto, and the determination may be made from the internal resistance of the battery 11 as described above. In this case, the presence or absence of the lithium precipitation can be determined by comparing the initial internal resistance of the battery 11 with the present internal resistance of the battery 11. The initial internal resistance of the battery 11 refers to the internal resistance of the battery 11 immediately after the battery 11 is manufactured. The present internal resistance of the battery 11 can be calculated from the current information and the voltage information of the battery 11 output from the monitor unit 31. The internal resistance may be the internal resistance of the entire battery 11 or the internal resistance of the lithium-ion cell 111 having the highest voltage value of the battery 11. For example, the ECU 30 may determine that the lithium precipitation occurs when the present internal resistance of the battery 11 reaches 1.3 times higher than the internal resistance of the battery 11 immediately after the manufacture.

(Modification 3)

Although the embodiment described above employs biphenyl as the compound which releases the protons, the present invention is not limited thereto. A different compound may be used which decomposes at an electric potential higher than the usage upper limit electric potential V3 and lower than the lithium precipitation electric potential V1. The different compound may be cyclohexylbenzene (CHB) having a benzene ring. Cyclohexylbenzene decomposes at an electric potential higher than that for biphenyl and lower than the lithium precipitation electric potential V1. Thus, the use of cyclohexylbenzene can change lithium precipitated on the negative electrode element back into lithium ions.

(Modification 4)

Although the embodiment described above includes the recovery processing for the battery 11 performed with the ignition (IG) switch of the vehicle turned off, the present invention is not limited thereto, and the recovery processing may be performed in a different manner. The different manner may be such that the recovery processing for the battery 11 is performed with the ignition (IG) switch of the vehicle turned on. For example, when two batteries 11 for use in running the vehicle are provided, one of the batteries requiring the recovery processing is prevented from being used as the battery for running, and the other battery is allowed to be used as the battery for running, thereby enabling the recovery processing without significantly affecting the vehicle running. Since the capacity or the internal resistance of the battery 11 is calculated during the vehicle running for different processing from the recovery processing (for example, the estimation of the electric storage amount (SOC)), the information obtained in the different processing can be used to determine the presence or absence of lithium precipitation. This can omit independent processing for determining the presence or absence of lithium precipitation to avoid the complication of the vehicle system.

(Modification 5)

Although the embodiment described above includes the recovery processing performed with the battery 11 mounted on the vehicle, the present invention is not limited thereto, and the recovery processing may be performed for the battery 11 removed from the vehicle in discarding the vehicle or inspecting the vehicle. In this case, liquid biphenyl can be put into the battery case for performing the recovery processing. For example, an inlet port of the battery case is opened and biphenyl can be put into the battery case through the opened inlet port under an inert atmosphere. The inlet port refers to an opening portion for introducing the electrolytic solution into the battery case.

Figure 6:
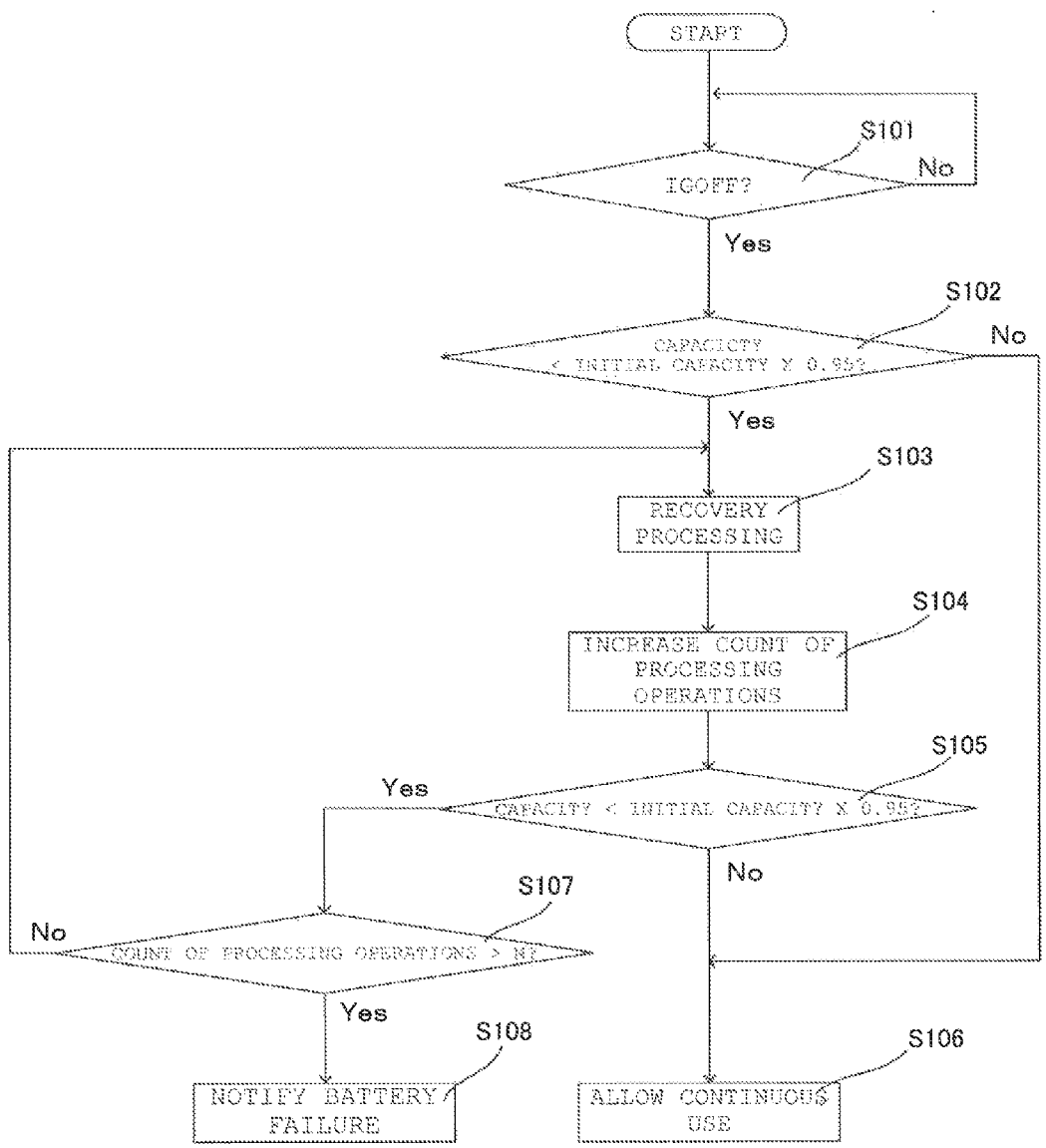
FIG. 6 A flow chart showing the procedure of recovery processing.

After biphenyl is introduced into the battery case, the processing shown in the flow chart of FIG. 6 (except step S101) can be performed to recover the battery 11. As a result, the battery 11 can be recycled in discarding the vehicle. In addition, the recovery processing for recovering the battery 11 can be performed together with another operation performed in inspecting the vehicle.

DESCRIPTION OF THE REFERENCE NUMERALS

1 CONTROL APPARATUS 2 LITHIUM-ION BATTERY 3 POWER SOURCE SECTION
4 ACQUIRING SECTION 5 CONTROLLER 6 ANOTHER COMPONENT SUCH AS ODOMETER
11 BATTERY 12 VOLTAGE CONVERTER 13 INVERTER
14 ENGINE 15 RELAY 30 ECU
31 MONITOR UNIT 32 STORAGE SECTION
111 LITHIUM-ION CELL

The invention claimed is:

1. An apparatus for controlling a lithium-ion battery in which a power-generating element including a positive electrode element and a negative electrode element is housed in a case,
    wherein the case contains a compound releasing an electron toward the positive electrode element to provide a proton at an electric potential lower than a first electric potential being a positive electrode potential corresponding to a negative electrode potential at which precipitation of lithium occurs, the electric potential lower than the first electric potential being a second electric potential, the second electric potential being higher than a positive electrode potential corresponding to an upper limit value of working voltages of the lithium-ion battery,
    the apparatus comprising a controller configured to perform recovery processing of changing the lithium precipitated on the negative electrode element into a lithium ion using the proton by supplying an electric power to both the positive electrode element and the negative electrode element of the lithium-ion battery and charging the lithium-ion battery to bring the positive electrode potential to the second electric potential.

2. The apparatus for controlling the lithium-ion battery according to claim 1, wherein the compound has a benzene ring.

3. The apparatus for controlling the lithium-ion battery according to claim 2, wherein the compound is biphenyl or cyclohexylbenzene.

4. The apparatus for controlling the lithium-ion battery according to claim 1, further comprising an acquiring section acquiring an evaluation value associated with a degree of lithium precipitation in the lithium-ion battery,
    wherein the controller performs the recovery processing when the evaluation value exceeds a predetermined value.

5. The apparatus for controlling the lithium-ion battery according to claim 4, wherein the evaluation value is a capacity of the lithium-ion battery.

6. The apparatus for controlling the lithium-ion battery according to claim 4, wherein the evaluation value is an internal resistance of the lithium-ion battery.

7. The apparatus for controlling the lithium-ion battery according to claim 1, wherein the controller performs discharge processing of reducing the positive electrode potential to a positive electrode potential corresponding to the working voltages of the lithium-ion battery after the positive electrode potential reaches the second electric potential.

8. The apparatus for controlling the lithium-ion battery according to claim 4, wherein the controller performs discharge processing of reducing the positive electrode potential to a positive electrode potential corresponding to the working voltages of the lithium-ion battery after the positive electrode potential reaches the second electric potential.

\* \* \* \* \*